United States Patent
Yeh et al.

(10) Patent No.: US 8,922,524 B2
(45) Date of Patent: Dec. 30, 2014

(54) TOUCH SENSING DEVICE AND ELECTRONIC SYSTEM INCLUDING THE SAME

(75) Inventors: Ting-Hao Yeh, Hsinchu (TW); Fu-Sheng Chang, Nantou County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 361 days.

(21) Appl. No.: 13/337,392

(22) Filed: Dec. 27, 2011

(65) Prior Publication Data

US 2013/0082975 A1    Apr. 4, 2013

(30) Foreign Application Priority Data

Sep. 29, 2011    (TW) ............................. 100135354 A (51) Int. Cl.
 *G06F 3/045*    (2006.01)
 *G06F 3/044*    (2006.01)
(52) U.S. Cl.
 CPC ..................................... *G06F 3/044* (2013.01)
 USPC .......................................... 345/174; 345/173
(58) Field of Classification Search
 USPC .................................................. 345/173, 174
 See application file for complete search history.

(56) References Cited

U.S. PATENT DOCUMENTS

| 2008/0007534 | A1* | 1/2008 | Peng et al. | 345/173 |
| 2010/0079384 | A1* | 4/2010 | Grivna | 345/173 |
| 2011/0069029 | A1* | 3/2011 | Ryu et al. | 345/173 |
| 2011/0210934 | A1 | 9/2011 | Lee et al. | |

FOREIGN PATENT DOCUMENTS

| TW | 201017495 A | 5/2010 |
| TW | 201040819 A | 11/2010 |

OTHER PUBLICATIONS

Taiwan Office Action dated Feb. 19, 2014 citing prior art, 5 pages.

* cited by examiner

*Primary Examiner* — Gerald Johnson
(74) *Attorney, Agent, or Firm* — Edell, Shapiro & Finnan, LLC (57) ABSTRACT

A touch sensing device including a touch sensing panel and P number of first sensors is provided. N sensing rows with a row spacing smaller than a predetermined touch diameter are defined on the touch sensing panel. The first sensors are for sensing whether the N sensing rows are touched. An n1-th sensing row and an n2-th sensing row share a same first sensor. The sensing rows directly neighboring to the n1-th and n2-th sensing rows respectively corresponds to the first sensors different from one another. N is an integer larger than 3; n1 and n2 are positive integers smaller than or equal to N. P is a positive integer smaller than N.

17 Claims, 6 Drawing Sheets

FIG. 8

TOUCH SENSING DEVICE AND ELECTRONIC SYSTEM INCLUDING THE SAME

This application claims the benefit of Taiwan application Ser. No. 100135354, filed Sep. 29, 2011, the subject matter of which is incorporated herein by reference.

BACKGROUND OF THE INVENTION

1. Field of the Invention

The invention relates in general to a touch sensing technique, and more particularly, to a technique capable of reducing a quantity of sensors implemented in a touch sensing device.

2. Description of the Related Art

Operating interfaces of modern electronic products have become increasingly user-friendly and intuitive as technology continues to advance. For example, through a touch screen, a user can directly operate programs as well as input messages/text/patterns, etc. with his fingers or a touch control pen, thus eliminating complications associated with input devices such as a keyboard or buttons. In practice, a touch screen usually comprises a touch sensing panel and a display disposed at the back of the touch sensing panel. According to a position of a touch point on the touch sensing panel and a currently displayed image on the display, an electronic device determines an intention of the touch to execute corresponding operations.

Figure 1:
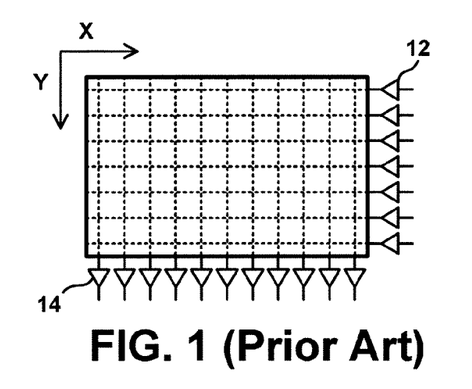
FIG. 1 is a schematic diagram of a conventional touch sensing device.

Existing touch sensing techniques can be categorized into resistive, capacitive, electromagnetic, ultrasonic and optic types. For a mutual-capacitive touch sensing technique, for example, a plurality of transparent sensing wires, arranged in a matrix, are disposed on the back of a touch sensing panel, as shown in FIG. 1. In this example, the sensing wires in the X direction are driving sensing wires whereas the sensing wires in the Y direction are receiving sensing wires. Still with reference to FIG. 1, each of the driving sensing wires is connected to a driver 12, and each of the receiving sensing wires is connected to a receiver 14. Generally, the drivers 12 sequentially send driving signals, and the receivers 14 continuously receive sensing signals. When a valid touch takes place, capacitance coupling occurs between the driving sensing wire and the receiving sensing wire corresponding to the touch point, resulting in a change in a sensing signal associated with a mutual capacitance. According to the receiver 14 which detects the change in the sensing signal and the driver 12 which sent out the driving signal at the time of the touch, a subsequent circuit determines a coordinate of the touch point with respect to the X and Y directions.

The number of drivers 12 and receivers 14 are closely related to a size of the touch screen. Consider a situation where a gap between every two sensing wires in the X direction and in the Y direction is 5 mm. Supposing a number of the drivers 12 is D and a number of the receivers 14 is R, a sensing region correspondingly has a maximum length of R*5 mm and a maximum width of D*5 mm. In other words, the number of drivers 12 and receivers 14 increases as the size of the touch screen gets larger, and consequently inevitably increases hardware costs. As with the mutual capacitive touch screen, other types of touch screens are also faced with the same issue.

SUMMARY OF THE INVENTION

The invention is directed to a hardware structure of a novel touch sensing device, in which a driver/receiver can be shared by different driving sensing wires/receiving sensing wires through an appropriate wire arrangement. Given that a size and a resolution of a touch sensing region remain unchanged, a same sensing effect can be rendered by utilizing a smaller number of drivers/sensors according to the touch sensing device of the present invention to reduce a hardware cost of the touch sensing device.

A touch sensing device comprising a touch sensing panel and P number of first sensors is provided according to an embodiment of the present invention. N sensing rows with a row spacing smaller than a predetermined touch diameter are defined on the touch sensing panel. The first sensors are for sensing whether the N sensing rows are touched. n1-th and n2-th of the N sensing rows share a first sensor. Sensing rows directly neighboring to the n1-th or n2-th sensing rows respectively correspond to different first sensors. N is an integer larger than three; n1 and n2 are positive integers smaller than or equal to N. P is a positive integer smaller than N.

A touch sensing device comprising a touch sensing panel, P number of first sensors and Q number of second sensors is provided according to another embodiment of the present invention. N sensing rows and M sensing columns are defined on the touch sensing panel. N and M are positive integers larger than 1. The P number of first sensors are for sensing whether the N sensing rows are touched. n1-th and n2-th of the N sensing rows share a first sensor. P is a positive integer smaller than N; n1 and n2 are different positive integers smaller than or equal to N. The Q number of second sensors drive the M sensing columns. The second sensors corresponding to the n2-th sensing row and an m1-th sensing column are different from the second sensors corresponding to the n2-th sensing row and the m1-th sensing column. Q is an integer larger than M; m1 is a positive integer smaller than or equal to M.

The above and other aspects of the invention will become better understood with regard to the following detailed description of the preferred but non-limiting embodiments. The following description is made with reference to the accompanying drawings.

DETAILED DESCRIPTION OF THE INVENTION

A touch sensing device is provided according to an embodiment of the present invention. For example, the touch sensing device may be integrated into an electronic system such as a mobile communication device, a tablet computer, a personal computer or an interactive information display panel. The touch sensing device comprises a touch sensing panel and P number of first sensors. N sensing rows are defined on the touch sensing panel. The P number of sensors are for sensing whether the N sensing rows are touched; where N is an integer larger than 3 and P is a positive integer smaller than N.

Figure 2A:
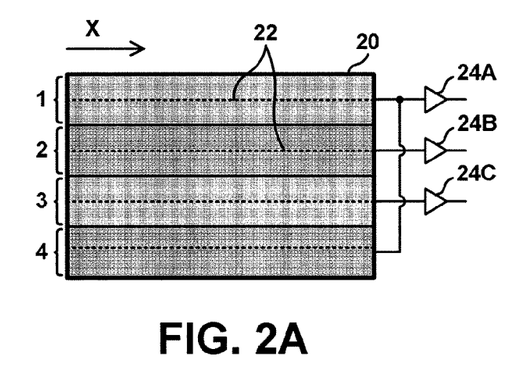
FIGS. 2A, 2B, 3A and 3B are schematic diagrams of a touch sensing device according to an embodiment of the present invention.
Figure 2B:
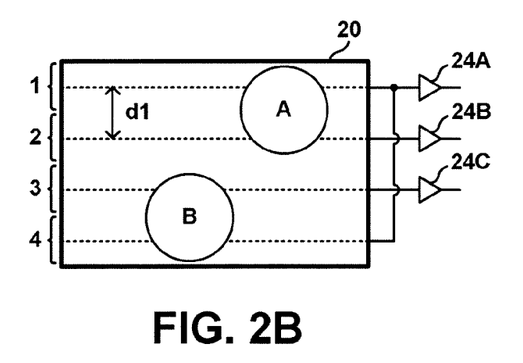

FIGS. 2A and 2B show examples in which N equals 4 and P equals 3. Four sensing rows in an X direction are defined on a touch sensing panel 20. Each of the sensing rows includes a sensing wire 22 (represented by a dotted line) in the middle. As shown in FIG. 2A, the sensing wire 22 in the first sensing row is coupled to a first sensor 24A, the sensing wire 22 in the second sensing row is coupled to a first sensor 24B, the sensing wire 22 in the third sensing row is coupled to a first sensor 24C, and the sensing wire 22 in the fourth sensing row is also coupled to the first sensor 24A. In other words, the first sensing row and the fourth sensing row share the same first sensor 24A.

Referring to FIG. 2B, a row spacing dl between every two sensing rows equals to a distance between every two sensing wires 22. The row spacing dl is designed to be smaller than a predetermined touch diameter, the predetermined touch diameter, for example, can be defined as a statistical minimum touch diameter of a user touch on the sensing rows, such that any touch comes into contact with at least two directly neighboring sensing rows. For example, assume that a common finger touch or a common pen point of a touch control pen has a diameter of at least larger than 6 mm, the row spacing may be correspondingly designed as 5 mm. In this embodiment, a touch point 'A' simultaneously covering the first and second sensing rows causes a change in output signals of the first sensor 24A and 24B. Similarly, a touch point B simultaneously covering the third and fourth sensing rows causes a change in output signals of the first sensors 24C and 24A.

In addition to the above design, the first sensors corresponding to the second and third sensing rows are different despite that the first sensor 24A is shared by the first and fourth sensing rows; therefore, a subsequent analyzing circuit is capable of determining whether the first sensing row or the fourth sensing row is touched. More specifically, the subsequent analyzing circuit may determine whether the touched position is at the first or fourth sensing row depending on whether a change in the output signal occurs in the first sensor 24B or the first sensor 24C simultaneously along with the first sensor 24A. When changes in the output signals occur around the same time in the first sensors 24A and 24B, it means the touched position is at the first sensing row. Conversely, when changes in the output signals occur around the same time in the first sensors 24A and 24C, it means the touched position is at the fourth sensing row.

Figure 3A:
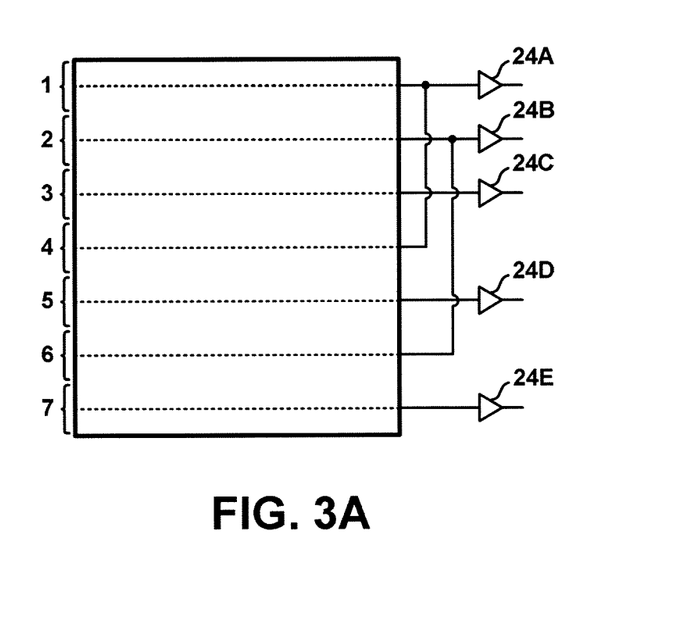
Figure 3B:
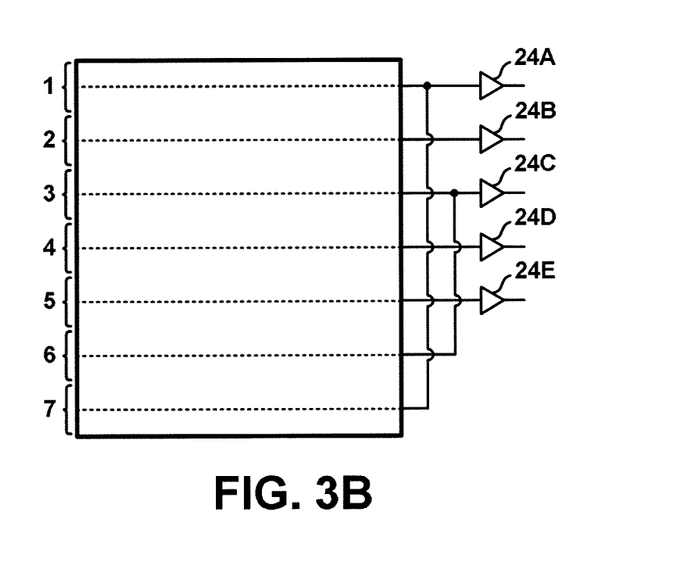

FIGS. 3A and 3B show examples in which N equals 7 and P equals 5. In the example shown in FIG. 3A, first and fourth sensing rows share a same first sensor 24A, second and sixth sensing rows share a same first sensor 24B, and the remaining three sensing rows respectively correspond to first sensors 24C, 24D and 24E. In the example shown in FIG. 3B, first and seventh sensing rows share a same first sensor 24A, third and sixth sensing rows share a same first sensor 24C, and the remaining three sensing rows respectively correspond to first sensors 24B, 24D and 24E. As previously stated, based on the fundamental design that any touch comes into contact with at least two directly neighboring sensing rows, although the first and fourth sensing rows share the same first sensor 24A and the second and sixth sensing rows share the same sensor 24B, a touched position can nevertheless be determined by identifying the first sensor in which a change in the output signal occurs about the same time as the first sensor 24A and the first sensor in which a change in the output signal occurs about the same time as the first sensor 24B. Similarly, in FIG. 3B, by identifying the first sensor in which a change in the output signal occurs about the same time as the first sensor 24A and the first sensor in which a change in the output signal occurs about the same time as the first sensor 24C, a touched position is determined. It should be noted that FIGS. 3A and 3B illustrate that more than one wire arrangement meets the essence of the present invention under conditions that N and P are constant values.

Figure 4:
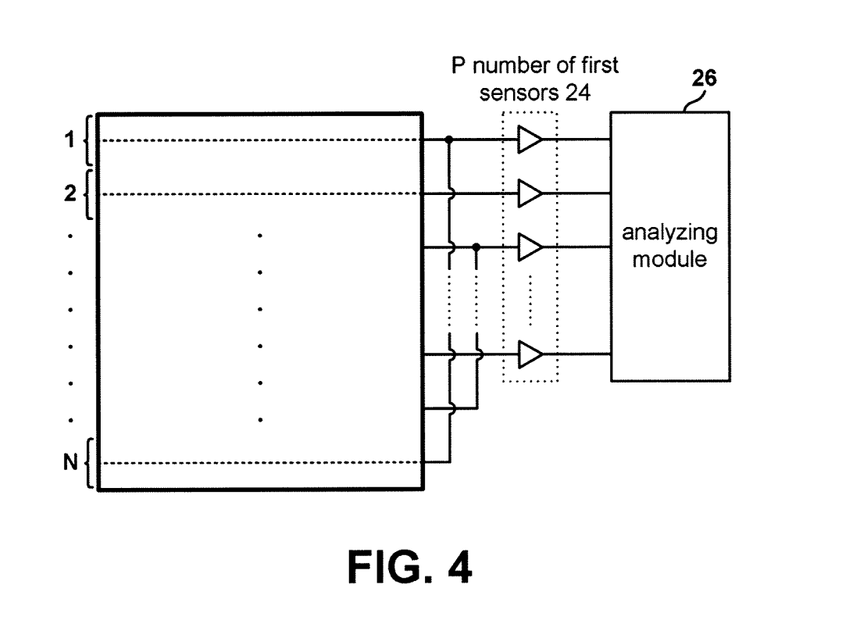
FIG. 4 is a schematic diagram of a touch sensing device further comprising an analyzing module according to an embodiment of the present invention.

It is observed from the above examples that, when the n1-th and n2-th of the N sensing rows are arranged to share a same sensor (where n1 and n2 are positive integers smaller than N), a subsequent analyzing circuit is capable of effectively preventing "ghost points", which would exist in the conventional design, as long as the sensing rows directly neighboring to the n1-th and n2-th sensing rows correspond to different first sensors. That is, a misjudgment of a touched position is at another sensing row (region) sharing a same sensor with the sensing row actually being touched can be prevented The above wire arrangement may be further applied to sharing a first sensor between more than two sensing rows. In other words, two sensing rows that shares the same first sensor are designed to have their neighboring sensing rows allocating to first sensors different from one another. In conclusion, through an appropriate wire arrangement, the touch sensing device of the present invention allows different sensing wires to share a first sensor to thus reduce a total number of first sensors FIG. 4 shows a touch sensing device further comprising an analyzing module according to an embodiment of the present invention. An analyzing module 26 determines which row/rows is/are touched by a user. As previously stated, when the output signal of the first sensor shared by the n1-th and n2-th sensing rows indicates an effective sensing region of the first sensor is touched, it means that either the n1-th or the n2-th sensing row is touched. According to the output signals of the first sensors corresponding to the other directly neighboring sensing rows, the analyzing module 26 determines whether the n1-th or the n2-th sensing row is touched. For example, supposing a sensing row directly neighboring to the n1-th sensing row is also touched, the analyzing module 26 determines that the n1-th sensing row is touched. In contrast, supposing a sensing row directly neighboring to the n2-th sensing row is also touched, the analyzing module 26 determines that the n2-th sensing row is touched.

Figure 5A:
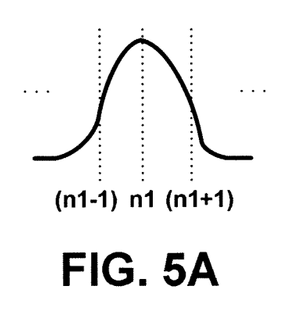
FIGS. 5A and 5B are examples of output signal distributions of a sensor.
Figure 5B:
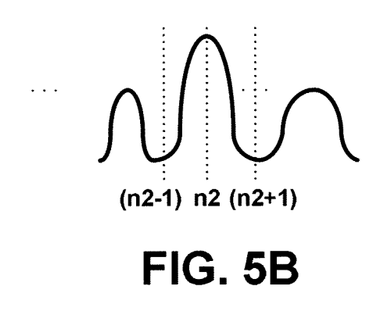

FIGS. 5A and 5B show examples of output signal distributions of the first sensors, with a vertical axis representing signal strength and a horizontal axis representing a row number. In the examples, a touched position is at the n1-th sensing row. As shown in FIGS. 5A and 5B, the signal strength corresponding to row numbers n1 and n2 is quite high, and the signal strength corresponding to the row numbers (n1+1) and (n1−1) is noticeably higher than those corresponding to row numbers (n2+1) and (n2−1). According to such difference, the analyzing module 26 determines that the n1-th sensing row rather than the n2-th sensing row is touched.

According to another embodiment of the present invention, each of the N sensing rows comprises M sensing columns, where M is an integral larger than 1. The touch sensing device further comprises Q number of second sensors for sensing whether the M sensing columns are touched, where Q is a positive integer smaller than M. Accordingly, the touch sensing device of the present invention is capable of correctly sensing and determining a position of a touch point on the touch sensing panel. It should be noted that, the P number of first sensors and the Q number of second sensors are all receiving sensors when the touch sensing panel 30 is a self-capacitive touch sensing panel; the P number of first sensors are P number of receiving sensors and the Q number of second sensors are Q number of driving sensors when the touch sensing panel 30 is a mutual-capacitive touch sensing panel.

Figure 6A:
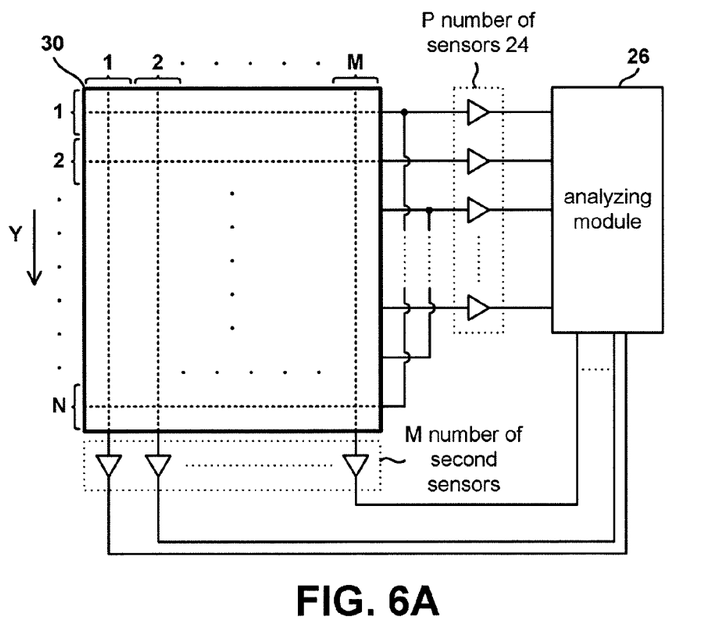
FIGS. 6A and 6B are schematic diagrams of a touch sensing device according to another embodiment of the present invention.

FIG. 6A shows an example in which Q equals M and the touch sensing panel 30 is a self-capacitive touch sensing panel. As shown in FIG. 6A, all M sensing columns in each of the sensing rows are coupled to a same second sensor by a sensing wire in a Y direction. When Q equals M, it means that the sensing columns respectively correspond to second sensors different from one another. Output signals of the M number of second sensors and output signals of the P number of first sensors are also provided to the analyzing module 26. The analyzing module 26 determines a planar position of a touch point on the touch sensing panel 30 according to the output signals of the P number of first sensors and the M number of second sensors.

Figure 6B:
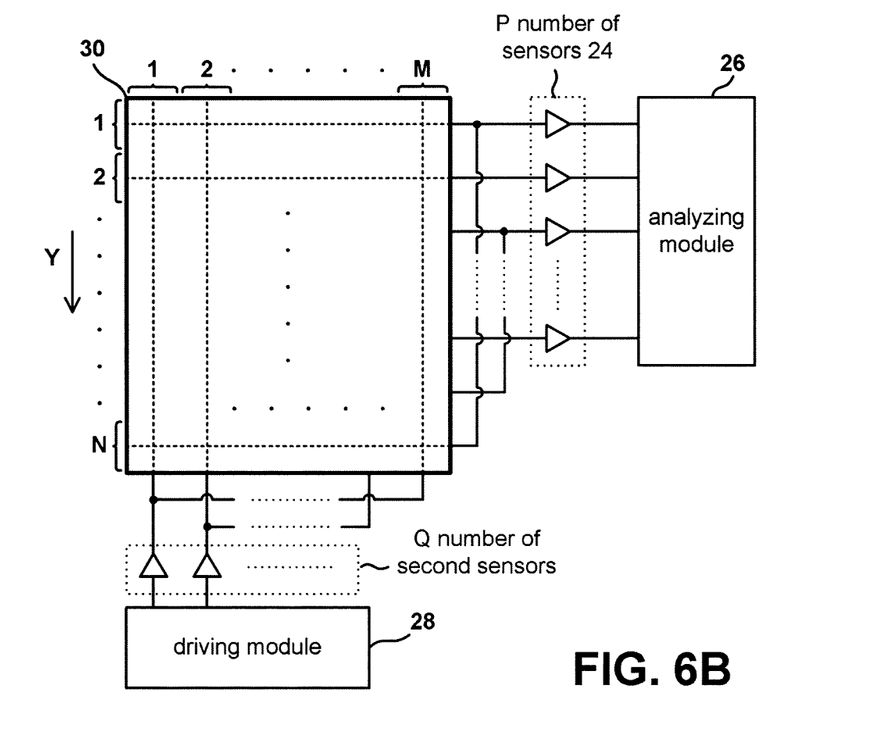

FIG. 6B shows an example in which Q is smaller than M and the touch sensing panel 30 is a mutual-capacitive touch sensing panel. In this example, M is larger than 3, and the Q number of driving sensors are controlled by a driving module 28. In this example, the concept of shared sensors through an appropriate wire arrangement may also be applied to sensing wires in a Y direction, and so Q may be smaller than M. In other words, m1-th and m2-th sensing columns of the M sensing columns may share a first sensor (where m1 and m2 are positive integers smaller than or equal to M); given that each of the sensing columns directly neighboring to the m1-th or the m2-th sensing columns correspond to a second sensor different from one another, the analyzing circuit 26 is capable of effectively identifying which sensing column is touched. Similarly, a column spacing of the sensing columns is also designed to be smaller than the foregoing minimum touch diameter; in this way, any touch comes into contact with at least two directly neighboring columns. It should be noted that, a shared sensor with an effective sensing region in the Y direction is not limited to covering two columns.

According to an embodiment of the present invention, the touch sensing panel 30 comprises a first side and a second side that are substantially perpendicular to each other but in unequal lengths. Due to a much more complex operational amplifier adopted in the receiving sensor than an inverter in the driving sensor, a hardware cost of the receiving sensor is usually higher than that of the driving sensor. Therefore, based on the reason that the receiving sensors and the driving sensors have the same approach of sensing and determining a touch point, the P number of receiving sensors may be arranged to correspond to the first side and the Q number of driving sensors may be arranged to correspond to the second side when the first side is shorter than the second side. Thus, an overall cost of the touch sensing device can be further reduced while a same optimal sensing effect is achieved.

Figure 7:
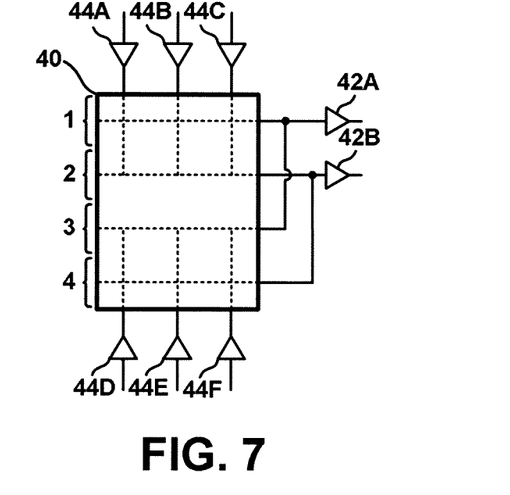
FIGS. 7 and 8 are schematic diagrams of a touch sensing device according to yet another embodiment of the present invention.

As shown in FIG. 7, a mutual-capacitive touch sensing device is provided according to another embodiment of the present invention. The touch sensing device comprises a touch sensing panel 40, P number of first sensors 42 and Q number of second sensors 44. N sensing rows and M sensing columns are defined on the touch sensing panel 40, where N and M are integers larger than 1. The P number of first sensors 42 are for sensing whether the N sensing rows are touched, where P is a positive integer smaller than N. The Q number of second sensors are for driving the M sensing columns, where Q is an integer larger than M. An example in which the touch sensing panel 40 is a mutual-capacitive touch sensing panel, the P number of first sensors 42 are receiving sensors and the Q number of second sensors 44 are driving sensors shall be described below.

FIG. 7 shows an example in which N equals 4 and M equals 3. In this example, a touch sensing device comprises two receiving sensors 42A and 42B and six driving sensors 44A to 44F. As shown in FIG. 7, first and third sensing rows share the receiving sensor 42A, and second and fourth sensing rows share the receiving sensor 42B. It should be noted that, a same sensing column in the first and third sensing rows respectively corresponds to different driving sensors. For example, the first sensing column in the first sensing row corresponds to the driving sensor 44A, whereas the first sensing column in the third sensing row corresponds to the driving sensor 44D.

According to a change in an output signal from the receiving sensor 42A, a subsequent analyzing circuit determines a planar position of a touch point according to which driving sensor sending out a driving signal at the time of the change. Similarly, according to a change in an output signal from the receiving sensor 42B, the subsequent analyzing circuit can also determine a planar position of a touch point according to which driving sensor sending out a driving signal at the time of the change.

It can be seen from the above examples that, when the n1-th and n2-th of the N sensing rows are arranged to share a same first sensor (where n1 and n2 are different positive integers smaller than or equal to N), given that the second sensor corresponding to the m1-th column in the n1-th sensing row is different from the second sensor corresponding to the m1-th sensing column in the n2-th sensing row (where m1 is a positive integer smaller than or equal to M), the subsequent analyzing circuit is capable of effectively determining which of the n1-th and n2-th sensing rows is touched. It should be noted that the number of sensing rows sharing a same sensor is not limited to two as long as the above principle of wire arrangement can be fulfilled. Furthermore, when a shared sensor indicates at least one corresponding sensing row is touched, the subsequent analyzing circuit may determine a position of a touch point according to signals of other sensing rows directly adjacent to above corresponding sensing row as well as which driving sensor that sends out a driving signal at the time of the change. For example, the n1-th sensing row and the n2-th sensing row are arranged to share a same first sensor. When the second sensor corresponding to the m1-th sensing column in the n1-th sensing row is the same as the second sensor corresponding to the m1-th sensing column in the n2-th sensing row, the different first sensors corresponding to the sensing rows directly neighboring to the n1-th sensing row and the n2-th sensing row may be utilized to determine which sensing row is touched.

In the above embodiment, the touch sensing device reduces the number of the first sensors also through an appropriate wire arrangement. When the first sensors are receiving sensors in a mutual-capacitive touch sensing panel, the above configuration also achieves a reduced overall cost. In addition, supposing the touch sensing panel has two sides that are substantially perpendicular to each other but in unequal lengths, the P number of receiving sensors may be arranged to correspond to the shorter side and the Q number of driving sensor may be arranged to correspond to the longer side.

Figure 8:
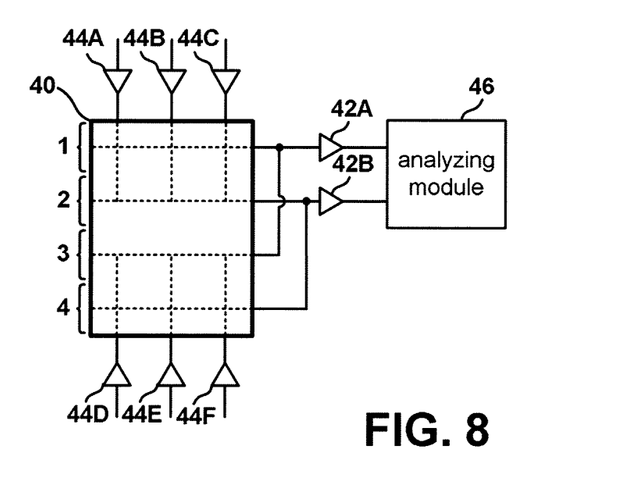

Referring to FIG. 8, the touch sensing device may further comprise an analyzing module 46. When the output signal from the first sensor 42A or 42B shared by the n1-th and n2-th sensing rows indicates the n1-th or the n2-th sensing row is touched, the analyzing module 46 determines which of the sensing rows is touched according to the output signals from the second sensors 44A to 44F.

An electronic system comprising the touch sensing device shown in FIG. 6A, FIG. 6B or FIG. 8 is provided according to an embodiment of the present invention. Apart from the touch sensing panel and the sensors, the electronic system further comprises a control module for determining a post-touch response of the electronic system according to an analysis result provided by the analyzing module. For example, when the electronic system is a tablet computer, the control module determines whether to execute or shut down an application program or to connect multiple touch points and convert the connected points into texts/graphics according to a user touch on the touch sensing panel. Operation details of the touch sensing device in the electronic system are omitted herein.

In conclusion, through an appropriate wire arrangement, a hardware structure of a novel touch sensing device disclosed herein enables different driving sensing wires/receiving sensing wires to share a same driver/receiver. Given that a size and a resolution of a touch sensing region remain unchanged, a same sensing effect can be rendered by utilizing a smaller number of drivers/sensors according to the touch sensing device of the present invention to reduce a hardware cost of the touch sensing device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch sensing device, comprising:
   a touch sensing panel, with N sensing rows defined thereon, N being an integer larger than 3, a row spacing between every two sensing rows being smaller than a predetermined touch diameter of a touching on the sensing rows;
   P number of first sensors, for sensing whether the N sensing rows are touched to generate output signals, P being a positive integer smaller than N, n1-th and n2-th sensing rows of the N sensing rows sharing a same first sensor of the P number of sensors, a plurality of sensing rows, among the N sensing rows, directly neighboring to the n1-th and n2-th sensing rows respectively corresponding to the first sensors different from one another; and
   Q number of second sensors, for driving the M sensing columns, Q being a positive integer smaller than M, the second sensor corresponding to the m1-th sensing column in the n1-th sensing row is different from the second sensor corresponding to the m1-th sensing column in the n2-th sensing row, m1 being a positive integer smaller than or equaled to M.

2. The touch sensing device according to claim 1, further comprising:
   an analyzing module, for determining a touched sensing row according to the output signals from the first sensors corresponding to at least one of the other directly neighboring sensing rows when the output signal from the first sensor shared by the n1-th and n2-th sensing rows indicates at least one of n1-th and n2-th sensing rows is touched.

3. The touch sensing device according to claim 2, wherein the analyzing module determines the n1-th sensing row is touched when one of the sensing rows directly neighboring to the n1-th row is also touched, and the analyzing module determines the n2-th sensing row is touched when one of the sensing rows directly neighboring to the n2-th row is also touched.

4. The touch sensing device according to claim 1, wherein M is larger than 3, Q is smaller than M, m1-th and m2-th sensing columns of the M sensing columns share a same second sensor of the Q number of sensors, m1 and m2 are positive integers smaller than or equaled to M, and a column spacing between every two sensing columns is smaller than the predetermined touch diameter.

5. The touch sensing device according to claim 1, wherein the touch sensing panel is a mutual-capacitive touch sensing panel, the P number of first sensors are P number of receiving sensors, and the Q number of second sensors are Q number of driving sensors.

6. The touch sensing device according to claim 5, wherein the touch sensing panel comprises a first side and a second side substantially perpendicular to each other, the first side is shorter than the second side, the P number of receiving sensors correspond to the first side, and the Q number of driving sensors correspond to the second side.

7. The touch sensing device according to claim 1, wherein the touch sensing panel is a self-capacitive touch sensing panel, and the P number of first sensors and the Q number of second sensors are receiving sensors.

8. A touch sensing device, comprising:
   a touch sensing panel, with N sensing rows and M sensing columns defined thereon, N and M being integers larger than 1;
   P number of first sensors, for sensing whether the N sensing rows are touched to generate an output signal, P being a positive integer smaller than N, n1-th and n2-th sensing rows of the N sensing rows sharing a same first sensor of the P number of sensors, n1 and n2 being different positive integers smaller than or equaled to N; and
   Q number of second sensors, for driving the M sensing columns, Q being a positive integer smaller than M, the second sensor corresponding to the m1-th sensing column in the n1-th sensing row is different from the second sensor corresponding to the m1-th sensing column in the n2-th sensing row, m1 being a positive integer smaller than or equaled to M.

9. The touch sensing device according to claim 8, further comprising:
   an analyzing module, for determining whether the n1-th and n2-th sensing rows are touched according to output signals from the second sensors when an output signal from the first sensor shared by the n1-th and n2-th sensing rows indicates at least one of n1-th and n2-th sensing rows is touched.

10. The touch sensing device according to claim 8, wherein the touch sensing panel is a mutual-capacitive touch sensing panel, the P number of first sensors are P number of receiving sensors, and the Q number of second sensors are Q number of driving sensors.

11. The touch sensing device according to claim 10, wherein the touch sensing panel comprises a first side and a second side substantially perpendicular to each other, the first side is shorter than the second side, the P number of receiving sensors correspond to the first side, and the Q number of driving sensors correspond to the second side.

12. An electronic system, comprising:
   a touch sensing panel, with N sensing rows defined thereon, N being an integer larger than 3, a row spacing between every two sensing rows being smaller than a predetermined touch diameter of a touching on the sensing rows;

P number of first sensors, for sensing whether the N sensing rows are touched to generate output signals, P being a positive integer smaller than N, n1-th and n2-th sensing rows of the N sensing rows sharing a same first sensor of the P number of sensors, n1 and n2 being positive integers smaller than or equaled to N, a plurality of sensing rows, among the N sensing rows, directly neighboring to the n1-th and n2-th sensing rows respectively corresponding to the first sensors different from one another;

Q number of second sensors, for driving the M sensing columns, Q being a positive integer smaller than M, the second sensor corresponding to the m1-th sensing column in the n1-th sensing row is different from the second sensor corresponding to the m1-th sensing column in the n2-th sensing row, m1 being a positive integer smaller than or equaled to M;

an analyzing module, for determining a touched sensing row according to the output signals from the first sensors corresponding to at least one of the other directly neighboring sensing rows when the output signal from the first sensor shared by the n1-th and n2-th sensing rows indicates at least one of n1-th and n2-th sensing rows is touched to generate an analysis result; and a control module, for operating in response to the analysis result.

13. The electronic system according to claim 12, the analyzing module determines the n1-th sensing row is touched when one of the sensing rows directly neighboring to the n1-th row is also touched and the analyzing module determines the n2-th sensing row is touched when one of the sensing rows directly neighboring to the n2-th row is also touched.

14. The electronic system according to claim 12, wherein M is larger than 3, Q is smaller than M, m1-th and m2-th sensing columns of the M sensing columns share a same second sensor among the Q number of sensors, m1 and m2 are positive integers smaller than or equaled to M, and a column spacing between every two sensing columns is smaller than the predetermined touch diameter.

15. The electronic system according to claim 12, wherein the touch sensing panel is a mutual-capacitive touch sensing panel, the P number of first sensors are P number of receiving sensors, and the Q number of second sensors are Q number of driving sensors.

16. The electronic system according to claim 15, wherein the touch sensing panel comprises a first side and a second side substantially perpendicular to each other, the first side is shorter than the second side, the P number of receiving sensors correspond to the first side, and the Q number of driving sensors correspond to the second side.

17. The electronic system according to claim 12, wherein the touch sensing panel is a self-capacitive touch sensing panel, and the P number of first sensors and the Q number of second sensors are receiving sensors.

* * * * *